(No Model.)
B. B. EDWARDS.
TOBACCO HANGER OR STICK.
No. 421,127. Patented Feb. 11, 1890.
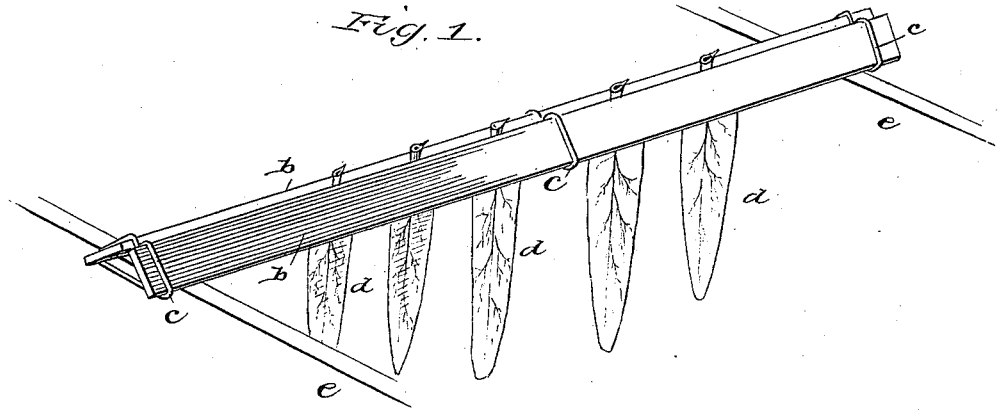
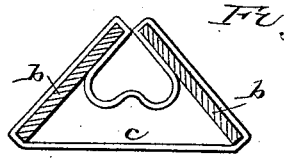
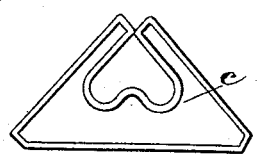
WITNESSES:
W. R. Davis
E. Sedgwick
INVENTOR:
B. B. Edwards
BY Munn & Co.
ATTORNEYS.

UNITED STATES PATENT OFFICE.

BURTON B. EDWARDS, OF BARNARD, NORTH CAROLINA.

TOBACCO HANGER OR STICK.

SPECIFICATION forming part of Letters Patent No. 421,127, dated February 11, 1890.

Application filed May 22, 1889. Serial No. 311,694. (No model.)

*To all whom it may concern:*

Be it known that I, BURTON B. EDWARDS, of Barnard, in the county of Madison and State of North Carolina, have invented a new and useful Improvement in Tobacco Hangers or Sticks, of which the following is a full, clear, and exact description.

This invention has for its object the providing of an improved hanger or stick for tobacco while being cured in the leaf in barns and elsewhere by heat. In a general way tobacco-farmers have been unable to cure all their crop of tobacco evenly on the stalk, it being essential to strip the leaves off in the field as they ripen and cure them, leaving the rest to stand and ripen. My improved stick, however, provides for commencing the curing as soon as the ground-leaves begin to ripen, and so that by the time it is usual to cut the tobacco the whole crop will have been gotten out of the way and a much brighter cure will be made, with less heat and less time than on the stalks in the ordinary way.

The invention consists in a stick of special construction for suspending the leaves to be artificially cured, and in certain details of the same, substantially as hereinafter described, and pointed out in the claims.

Reference is to be had to the accompanying drawings, forming a part of this specification, in which similar letters of reference indicate corresponding parts in all the figures.

Figure 1 represents a view in perspective of a tobacco-stick embodying my invention, showing the same in position for use and with a series of tobacco-leaves suspended by it for curing. Fig. 2 is a transverse section of said stick, and Fig. 3 is a side view of a spring used in the construction of the stick.

The entire stick is of inverted-V shape in transverse section, and of any desired length and general dimensions. I prefer, however, to make it of from three and a half to four and a half feet in length, so that it may be conveniently handled and carried into and out of the field, any number of such sticks being used for the curing of the crop. Each stick is composed in part of two wooden side strips $b\ b$, which meet, or nearly so, at their upper edges, but are spread apart below, thus giving to the stick its inverted-V shape, and in part of any number of transverse springs arranged at suitable distances apart in the length of the stick, and which serve to hold the strips $b\ b$ together in their above-described relation, and to give them an elastic grip or clamping action at or between their upper edges to hold the suspended tobacco-leaves $d$, the sticks themselves when being used resting at their lower and spread edges upon tier-poles $e$ in the barn, thus presenting a broad base for their steady support.

The springs might be variously constructed of either steel or hard brass; but it is preferred to stamp each one (indicated by the letter $c$) out of hard brass in a single piece, as shown in the drawings, and so that each spring will consist of a base portion and opposite upwardly-converging sides bent over above to form upper pockets for the strips $b\ b$, and terminating in the interior of the spring without any break. These springs as thus constructed will bend equally, have no ends to be twisted, as in the case of wire springs, and their form will be more perfect by being cut or stamped out of a given size, so that they may be slipped on and off the strips $b\ b$ easily, but always holding said strips in proper relation with each other. Said strips $b\ b$ are readily slipped into their places in the springs as they are required to be used in hanging the tobacco-leaves.

The leaves when suspended for curing are clamped in between the wooden portion of the stick—that is, between the strips $b\ b$, between the springs—so that only the wooden portions of the stick come into contact with the tobacco and do not corrode or injure it. Furthermore, by the disposition of the springs the stick clamps the tobacco without mutilating it, and the wooden strips and springs, or "spring-clamps," as they may be termed, can be taken separately to the field and be put together as needed, the springs or spring-clamps being fitted so as to be readily slipped on and off the wooden strips. Every facility, in fact, is afforded for filling the sticks, and the rapidity with which each stick can be emptied when the tobacco is cured constitutes an important feature of the invention. The tobacco-leaves being held by their own weight, assisted by the clamping-springs, the heavier the weight of the tobacco the tighter the hold, and the tobacco can be handled while in the stick without danger of dropping the leaves before curing and after they are cured. The clamping-strings, too, prevent the wooden strips from warping while exposed to the heat necessary in curing, and the inverted-V shape of the stick allows the heat to concentrate or accumulate, so as to cure the butts of the leaves as fast as the bodies of the leaves themselves. Again, the facility of putting together the stick and taking it apart will be a great advantage, both as regards shipping, storing, and use of the sticks.

Having thus described my invention, what I claim as new, and desire to secure by Letters Patent, is—

1. In devices for hanging tobacco while being cured, a stick for suspending the leaves of the plant by their butts, composed of opposite upwardly-converging side strips and spring-clamps uniting said strips in said relation with each other, substantially as specified.

2. In devices for hanging tobacco while being cured, a stick for suspending the leaves of the plant by their butts, composed of opposite upwardly-converging wooden side strips $b\,b$ and a series of entire or close slip spring-metal clamps $c$, constructed to form pockets for reception of the upper portions of said strips and adapted to hold said strips in their specified relation with each other, essentially as set forth.

BURTON B. EDWARDS.

Witnesses:
E. B. ATKINSON,
M. W. ATKINSON.